United States Patent
Ono

[11] Patent Number: 5,699,366
[45] Date of Patent: Dec. 16, 1997

[54] DATA COMMUNICATION APPARATUS HAVING AN ERROR CORRECTION MODE

[75] Inventor: Takashi Ono, Yokosuka, Japan

[73] Assignee: Canon Kabushiki Kaisha, Tokyo, Japan

[21] Appl. No.: 371,516

[22] Filed: Jan. 11, 1995

Related U.S. Application Data

[63] Continuation of Ser. No. 831,152, Feb. 5, 1992, abandoned.

[30] Foreign Application Priority Data

Feb. 7, 1991 [JP] Japan ................. 3-015627

[51] Int. Cl.[6] .................................. G08C 25/02
[52] U.S. Cl. .................. 371/32; 371/33; 371/62
[58] Field of Search ..................... 371/32, 33, 62, 371/5.1; 395/182.16

[56] References Cited

U.S. PATENT DOCUMENTS

| | | | |
|---|---|---|---|
| 3,956,589 | 5/1976 | Weathers et al. | 371/32 |
| 4,422,171 | 12/1983 | Wortley | 371/32 |
| 4,549,297 | 10/1985 | Nishimoto | 371/33 |
| 4,584,684 | 4/1986 | Nagasawa et al. | 371/33 |
| 4,750,176 | 6/1988 | Van Veldhuizen | 371/32 |
| 4,766,596 | 8/1988 | Michels-Krohn et al. | 371/62 |
| 5,027,358 | 6/1991 | O'Dell et al. | 371/62 |
| 5,031,179 | 7/1991 | Yoshida et al. | 371/32 |
| 5,057,938 | 10/1991 | Edamura | 371/32 |
| 5,077,742 | 12/1991 | Tsumura et al. | 371/32 |
| 5,105,423 | 4/1992 | Tanaka | 371/32 X |
| 5,159,465 | 10/1992 | Maemura | 358/405 |
| 5,220,439 | 6/1993 | Yoshida | 358/404 |
| 5,224,105 | 6/1993 | Higley | 371/32 |
| 5,483,545 | 1/1996 | Darmon | 371/32 |

*Primary Examiner*—Robert W. Beausoliel, Jr.
*Assistant Examiner*—Dieu-Minh Le
*Attorney, Agent, or Firm*—Fitzpatrick, Cella, Harper & Scinto

[57] ABSTRACT

A data communication apparatus, having an error correction mode, for receiving data in units of predetermined data frames, and for, upon reception of an error frame, starting a procedure signal communication mode so as to cause a transmission-side apparatus to resend data, includes a detecting unit for detecting whether or not a significant frame is received within a first time during reception of data frames, and receiving unit for, when it is determined that the significant frame is not received within the first time, starting the procedure signal communication mode to detect reception of a procedure signal from the transmission-side apparatus.

9 Claims, 3 Drawing Sheets

DATA COMMUNICATION APPARATUS HAVING AN ERROR CORRECTION MODE

This application is a continuation of application Ser. No. 07/831,152 filed Feb. 5, 1992, now abandoned.

BACKGROUND OF THE INVENTION

1. Field of the Invention

The present invention relates to a communication apparatus and, more particularly, to a data communication apparatus which has an error correction mode for receiving data in units of predetermined data frames, and for, upon reception of an error frame, shifting to a procedure signal communication mode to cause a transmission-side apparatus to resend data.

2. Related Background Art

In some conventional communication apparatuses such as facsimile apparatuses using analog modems, a carrier detector is used for detecting no-carrier so as to start in low-speed command reception, as a recovery method which is to be executed when the modem diverges (i.e., exceeds the permitted level for AGC) or overruns due to one-side interruption of transmission by a transmitter, or noise or instantaneous disconnection of a line, and thereby normal data cannot be obtained.

However, normally, the carrier detector often responds to noise. In this case, if the noise level is high, the no-carrier cannot be determined even when no signal is sent.

As the carrier detector, a detector, which comprises a one-chip LSI, and is incorporated in a modem, is normally used. However, when the modem diverges or overruns, an output from the carrier detector is indefinite. Therefore, the no-carrier cannot be accurately detected when the modem overruns.

When a transmitter suffers from a trouble, and keeps outputting insignificant energy, no-carrier is not detected so that a high-speed reception mode remains.

As an application associated with a facsimile apparatus having an error resend mode, U.S. patent application Ser. No. 371,847 (application date: Jun. 27, 1989) is known. However, no applications that can solve the above-mentioned problems have been proposed yet.

SUMMARY OF THE INVENTION

It is an object of the present invention to improve a data communication apparatus in consideration of the above-mentioned problems.

It is another object of the present invention to provide a data communication apparatus, which can reliably recover a normal state even when a modem diverges or overruns due to one-side interruption of transmission by a transmitter, or noise or an instantaneous disconnection of a line in a data reception mode.

It is still another object of the present invention to provide a data communication apparatus, having an error correction mode, for receiving data in units of predetermined data frames, and for, upon reception of an error frame, shifting to a procedure signal communication mode so as to cause a transmission-side apparatus to resend data, wherein when a significant data frame is not received for a predetermined period of time, the procedure signal communication mode is started to receive a procedure signal from the transmission-side apparatus, thereby re-synchronizing a data communication.

Other objects of the present invention will become apparent from the following detailed description of the embodiments taken in conjunction with the accompanying drawings.

DETAILED DESCRIPTION OF THE PREFERRED EMBODIMENTS

An embodiment of the present invention will be described in detail hereinafter with reference to the accompanying drawings. The embodiment to be described below exemplifies an arrangement of a facsimile apparatus having an ECM (error correction mode).

Figure 1:
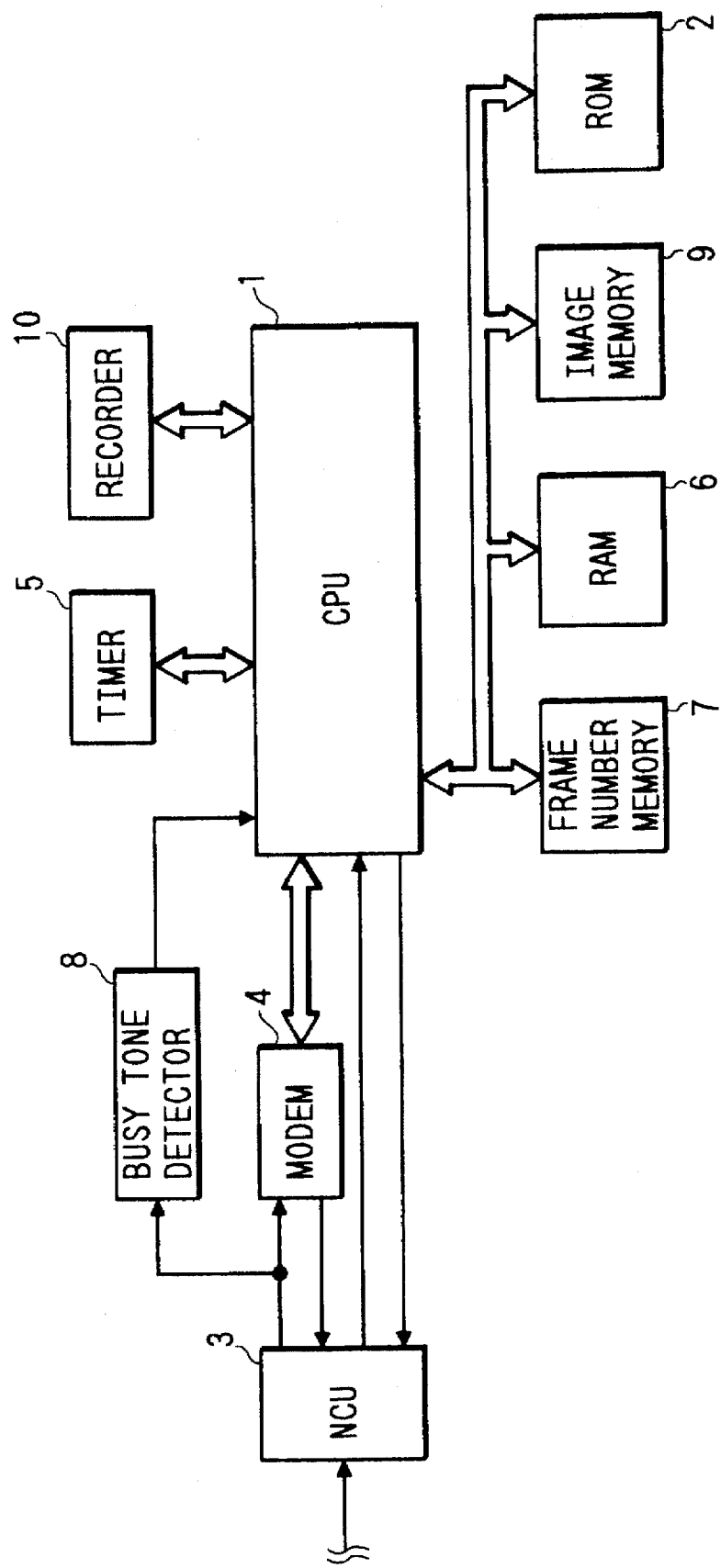
FIG. 1 is a block diagram showing an arrangement of a facsimile apparatus according to an embodiment of the present invention.

FIG. 1 shows the arrangement of a facsimile apparatus of this embodiment. FIG. 1 illustrates only principal part of a reception system, and does not illustrate a transmission system such as a reader.

In FIG. 1, a controller (CPU) 1 comprises, e.g., a microprocessor, and controls operations of the overall apparatus according to control programs (to be described later) stored in a ROM 2.

The CPU 1 is connected to the following members indicated by numeral 3 and subsequent numerals through address and data buses, and the like.

An NCU 3 performs a line exchange operation, a loop holding operation, and the like with a telephone set (not shown).

A modem 4 modulates/demodulates transmission/reception signals based on a modulation method defined by, e.g., the CCITT V series recommendations.

A timer 5 is used for measuring the current time, and performing, e.g., timer transmission/reception control, and error control (to be described later).

A RAM 6 is used as a work area, a control parameter storage area, and the like of the CPU 1.

A frame number memory 7 stores the frame number of a data frame, which has been normally received in an ECM communication mode.

A busy tone detector 8 detects a busy tone of a station at the end of the line. An image memory 9 stores image data to be transmitted or received image data. A recorder 10 decodes and records received image data, and adopts, e.g., a recording mechanism such as a laser beam printer, a thermal printer, or the like.

In this arrangement, when a data frame received in the ECM mode is normal, the frame number of the received data frame is stored in the frame number memory, and corresponding image data is stored in the image data memory.

If an error frame is detected, a time until the next normal frame is received is measured. When a normal frame is not received after an elapse of a predetermined period of time, a low-speed command (300-bps procedure signal) reception mode is started. If this predetermined period of time is set to be 6 seconds or less, a PPS (partial or virtual page signal) can be received even when only an RCP (return to control for partial or virtual page signal) suffers from an error.

Furthermore, thereafter, a time until a significant low-speed command is received is measured. When the significant low-speed command is not received after an elapse of a predetermined period of time, a communication is ended. At this time, the predetermined period of time can be considered as a time required for transmitting 256 frames at 2,400 bps in consideration of the worst case, and is about 4 minutes in practice.

However, if the predetermined period of time is uniquely set to be 4 minutes regardless of the transmission speed, even when a communication is performed at 9,600 bps, the line is wastefully kept seized for 4 minutes in the worst case. Therefore, a low-speed command wait time is set to be a time necessary for transmitting 256 frames at a selected transmission speed.

Thus, even when a transmitter interrupts transmission of image data, or keeps outputting insignificant energy due to its trouble, a communication can be ended within a short period of time, and the line can be released.

Since the frame numbers of normally received frames are stored in the frame number memory, the maximum value of the remaining number of frames can be calculated based on the frame number of the finally received normal frame.

For example, if the frame number of the finally received normal frame is represented by n, the remaining frames are a maximum of (256-n) frames. Thus, it is necessary to wait for only a period required for transmitting these remaining frames.

Therefore, the time required until the finally received normal frame is received can be subtracted from the previously set time (represented by T) necessary for transmitting 256 frames.

The number of data necessary for constituting one frame is a minimum of 263 bytes including flag, address, control, FCF (facsimile control signal), a frame number, image data, and FC8 (Flag Continuous 8 Bytes, or continuous 8 byte flag). Therefore, the low-speed command wait time is given by:

$$T = \frac{n \times 263 \times 8}{\text{Transmission Speed}}$$

Thus, it is necessary to only wait for such time. A time for which a line is wastefully seized can be further shortened.

When the busy tone detector 8 detects a busy tone while awaiting a low-speed command, the line is immediately released.

Thus, when a transmitter interrupts transmission, and releases the line, a receiver can immediately end a communication and release the line.

Figure 2:
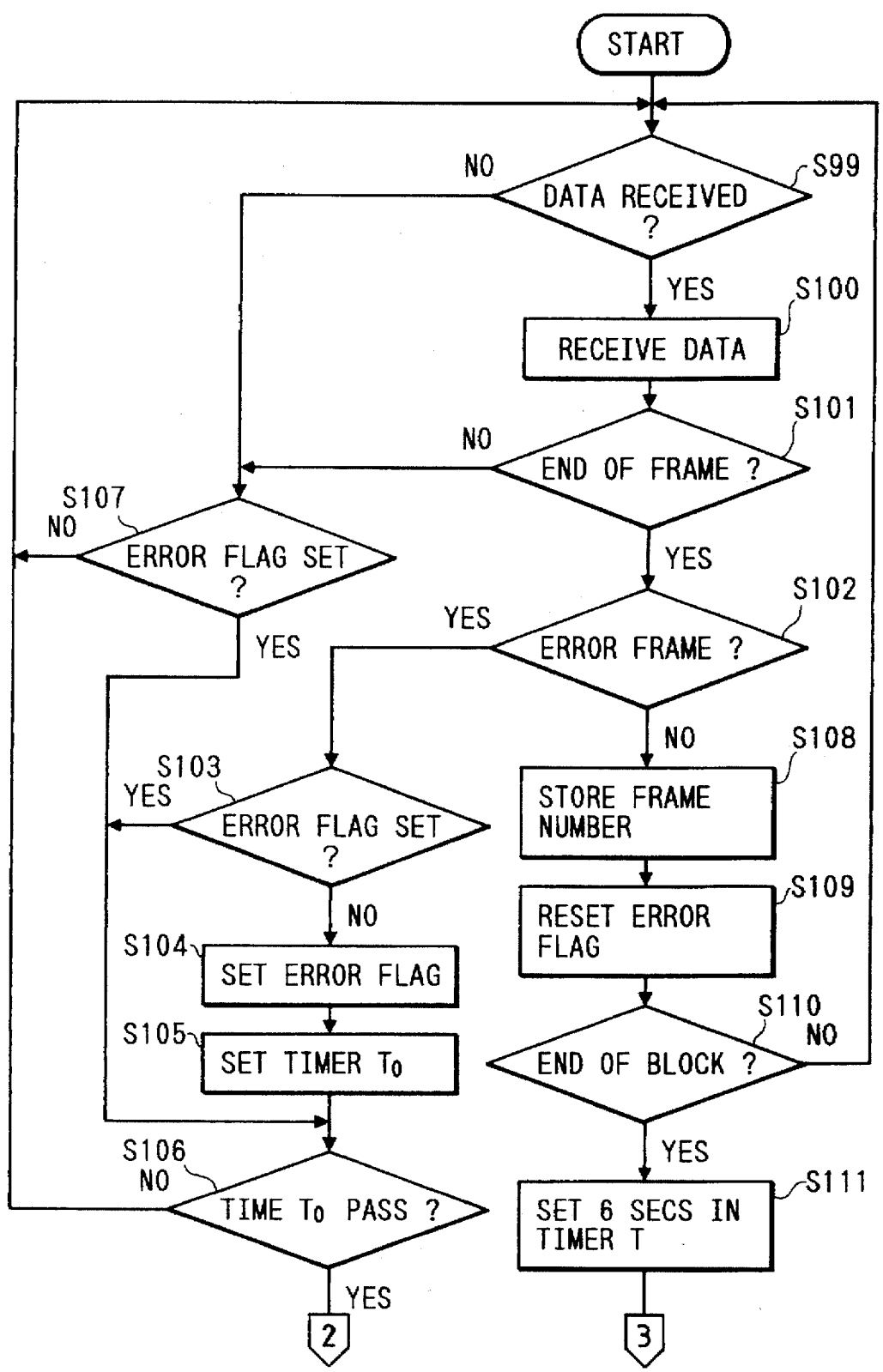
FIG. 2 is a flow chart showing a reception control sequence.
Figure 3:
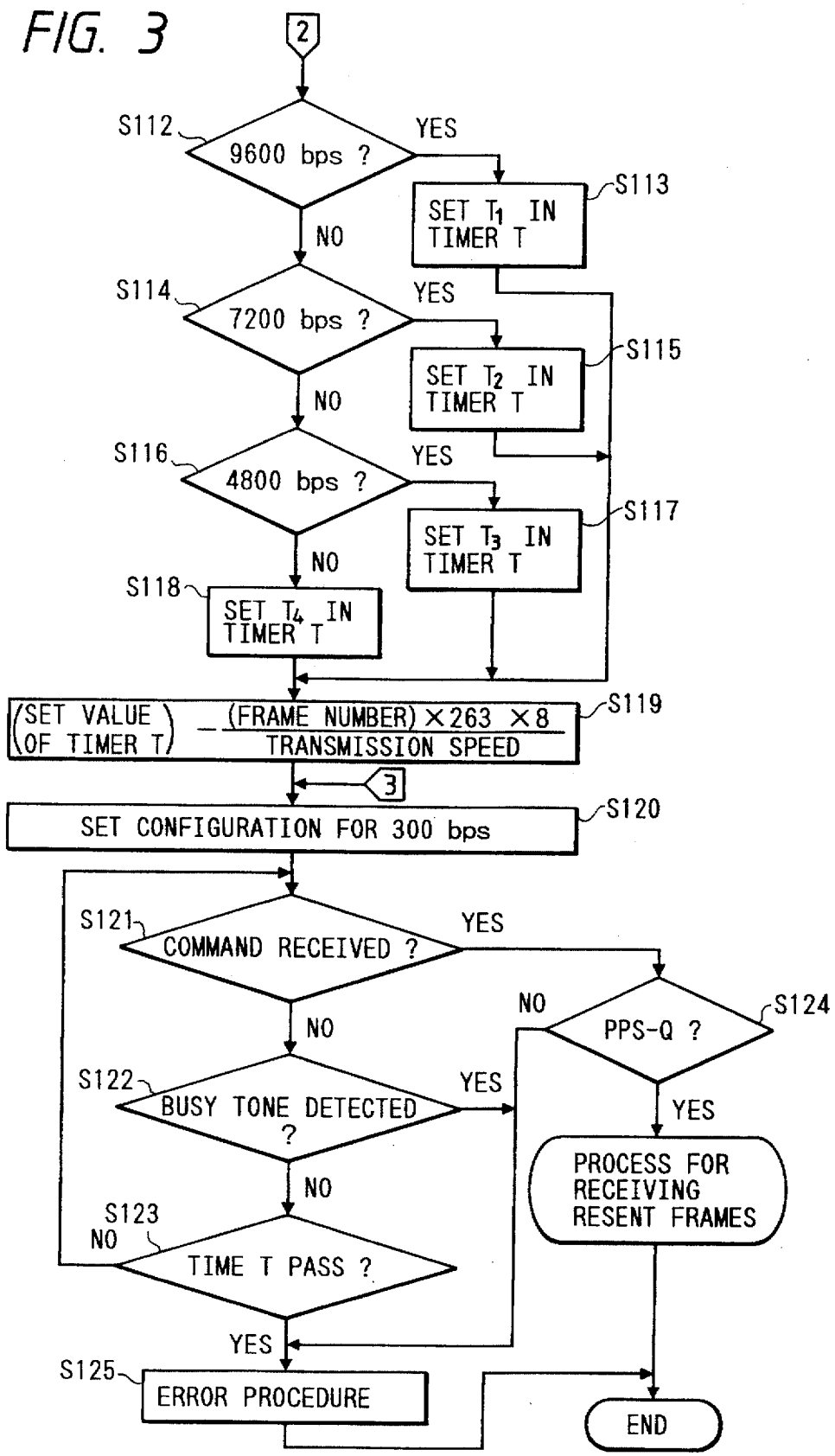
FIG. 3 is a flow chart showing a reception control sequence.

The above-mentioned operation will be described below with reference to FIGS. 2 and 3. FIGS. 2 and 3 show control programs stored in the ROM 2, and executed by the CPU 1 in an ECM reception mode. In FIGS. 2 and 3, e.g., call termination control is omitted.

The CPU 1 checks in step S99 if data is received. If N (NO) in step S99, the flow advances to step S107; otherwise, the flow advances to step S100.

In step S100, the CPU 1 reads received data from the modem 4.

In step S101, the CPU 1 detects the end of a frame. If Y (YES) in step S101, the flow advances to step S102; otherwise, the flow advances to step S107.

If the end of reception of one frame is detected, the CPU 1 checks in step S102 if the received frame is an error frame. If Y in step S102, the flow advances to step S103; otherwise, the flow advances to step S108.

In step S103, the CPU 1 checks if an error flag indicating that an error frame continues is set. If Y in step S103, the flow advances to step S106; otherwise, the flow advances to step S104 to set the error flag.

The error flag is not reset unless the next normal frame is received. While this flag is set, a timer T0 started in step S105 measures a time. Timers to be described below are realized by utilizing the timer 5 shown in FIG. 1 or an internal timer of the CPU 1.

If a time to be measured by the timer T0 is set to be 6 seconds (a time T2 based on the CCITT recommendation), a PPS can be received even when only an RCP causes an error.

In step S106, the CPU 1 checks the count of the timer to determine if a time T0 passes. If Y in step S106, the flow advances to step S112 in FIG. 3; otherwise, the flow returns to step S99 to continue the reception processing.

In step S107, the CPU 1 detects if the error flag is set in the same manner as in step S103. If N in step S107, the flow advances to step S106; otherwise, the flow returns to step S99 to continue the reception processing.

In step S108, when a normal frame is received, its frame number is stored in the frame number memory. Furthermore, in step S109, since the normal frame is received, the error flag is reset.

In step S110, the CPU 1 checks if the end of a data block is reached. If the CPU 1 does not detect the end of the data block, the flow returns to step S99 to continue the reception processing. If the end of the data block is detected, the flow advances to step. S111 to set 6 seconds (the time T2 based on the CCITT recommendation) in a timer T for setting a low-speed command wait time.

In steps S112, S114, and S116 in FIG. 3, the CPU 1 checks a current communication speed. In this case, one of the communication speeds of 9,600 bps, 7,200 bps, and 4,800 bps is detected, and one of timer values T1 to T3 is set in the timer T in correspondence with the detected speed in step S113, S115, or S117.

If N in steps S112, S114, and S116, it is determined that the communication speed is a minimum speed, i.e., 2,400 bps, and a timer value T4 according to the detected speed is set in step S118.

The timer values T1 to T4 are respectively defined as times (to be referred to as NULL times hereinafter) necessary for transmitting/receiving 256 frames at the corresponding communication speeds.

In step S119, a minimum time until the finally received normal frame is received is calculated based on the frame number of this frame, and the calculated time is subtracted from the time T, thereby correcting a low-speed command wait time to a time value sufficient to end transmission of the remaining frames.

In step S120, in order to receive a low-speed command (e.g., a V21 modem signal) after error detection, a configuration is performed to change the communication speed, and its associated parameters to 300 bps, and corresponding values.

In a loop consisting of steps S121 to S123, a significant low-speed command is detected for a time interval corresponding to the timer value T finally determined in step S119. In this loop, a busy tone is detected by the busy tone detector 8 in step S122.

If the significant command is received in step S121, and it is confirmed in step S124 that the received command is a PPS-Q signal (Q is one of EOM (end of message signal), MPS (multi-page signal), EOP (end of page signal), and the like), the flow advances to processing for receiving resent frames. However, if Y in step S123 while a busy tone is not detected in step S122, and a significant command is not received, an error procedure is executed in step S125.

In step S125, a communication error is informed to a user, and the line is released by the NCU 3.

Note that the above-mentioned times T1 to T4 are set to include a slight margin since it cannot be determined how many inter-frame flags are inserted and transmitted by a transmitter.

A minimum time necessary for transmitting 256 frames at, e.g., 9,600 bps is given by:

256 (frames)×263 (bytes)×8 (bits)/9,600 (bps)

(corresponding to about 56 seconds) Thus, the timer T1 is set to be about 1 minutes. The times T2 to T4 are similarly determined.

It is effective to set the predetermined period of time to be a time (e.g., 6 seconds) capable of receiving a PPS-Q signal even when only an RCP signal cannot be received.

According to this embodiment, when a significant frame is not received for a predetermined period of time during reception of high-speed signals, a low-speed command reception mode is started, and in this case, 1) when a busy tone is detected during detection of a low-speed command (step S122), or 2) when a significant low-speed command cannot be detected for a predetermined period of time or more (step S123), a communication is ended. Therefore, unlike in the conventional method based on carrier detection, even when a modem diverges or overruns due to mixing of noise or an instantaneous disconnection of a line, a resend request for frames that could not be received can be issued as long as only a PPS-Q signal can be received. In this manner, a communication can be safely continued.

If an arrangement for properly changing the low-speed command wait time is adopted, even when a transmitter interrupts transmission of high-speed data, a communication can be ended within a short period of time. Even when the transmitter overruns, and keeps outputting signal energy, a time for which a communication line is wastefully seized can be shortened.

In this embodiment, no description about a data resend mode is made. In the data resend mode, since the number of frames to be sent is known in advance, the low-speed wait time is changed according to the number of frames.

If another time measurement means is arranged to measure a NULL time from the first frame independently of the presence/absence of an error frame, the low-speed command wait time can be determined without a calculation in step S119. More specifically, when a low-speed command is not received after an elapse of the NULL time from the first frame, a communication may be ended.

The above embodiment exemplifies a facsimile apparatus. The above-mentioned arrangement can be applied to any other data communication apparatuses, which have an error correction mode, and start a procedure signal communication mode upon detection of an error so as to cause a transmission-side apparatus to resend data.

The present invention is not limited to the above embodiment, and various modification may be made.

What is claimed is:

1. A data communication apparatus, having an error correction mode, for receiving data in units of blocks at a first speed, each block including a plurality of data frames, and for shifting to a procedure signal communication at a second speed different from the first speed after the end of reception of a block of data so as to receive a first procedure signal from a transmission side apparatus and transmit to the transmission side apparatus a second procedure signal for requiring the transmission side apparatus to resend data upon reception of an error frame and the first procedure signal, said data communication apparatus comprising:

means for detecting an end of block data on the basis of a received signal;

means for detecting reception of error frames;

means responsive to detection of received error frames for determining whether or not error frames are consecutively received for a predetermined time;

means for shifting to the procedure signal communication from the reception of the block data at the first speed to receive the first procedure signal at the second speed from the transmission side apparatus, in accordance with the detection of the end of the block data; and means for shifting to the procedure signal communication from the reception of the block data at the first speed to receive the first procedure signal at the second speed from the transmission side apparatus, in accordance with a determination result of said determining means.

2. An apparatus according to claim 1, further comprising:

means for detecting that the transmission side apparatus releases a communication line; and means for terminating the communication in a case where said detecting means detects that the communication line is released, during detection of the first procedure signal from the transmission side apparatus through the communication line.

3. An apparatus according to claim 1, further comprising means for terminating the communication in a case where the first procedure signal is not received within a predetermined time during the detection of the first procedure signal from the transmission side apparatus.

4. An apparatus according to claim 3, wherein the predetermined time in the detection of the procedure signal from the transmission side apparatus is a time corresponding to a time required for transmitting one block of data.

5. An apparatus according to claim 1, wherein the frame data is communicated at a first speed, and the procedure signal is communicated at a speed lower than the first speed.

6. A data communication method for receiving data in units of a predetermined number of data frames at a first speed, and for shifting to a procedure signal communication at a second speed different than the first speed after the end of reception of the predetermined number of data frames so as to receive a procedure signal from a transmission side apparatus, comprising steps of:

detecting an end of block data on the basis of a received signal;

detecting reception of error frames;

in response to detection of received error frames, determining whether or not error frames are consecutively received for a predetermined time;

shifting to the procedure signal communication from the reception of the block data at the first speed to receive the procedure signal at the second speed from the transmission side apparatus, in accordance with the detection of the end of the block data; and shifting to the procedure signal communication from the reception of the block data at the first speed to receive the procedure signal at the second speed from the transmission side apparatus, in accordance with a determination result in said determining step.

7. A method according to claim 6, further comprising the step of ending a communication when it is detected during detection of the procedure signal that the transmission-side apparatus releases a line.

8. A method according to claim 6, further comprising the step of terminating communication when a significant procedure signal is not received for a predetermined period of time or more during detection of the procedure signal from the transmission side apparatus.

9. A method according to claim 6, wherein the frame data is communicated at a first speed, and the procedure signal is communicated at a speed lower than the first speed.

* * * * *